(12) United States Patent
Cooppan

(10) Patent No.: US 9,716,623 B2
(45) Date of Patent: Jul. 25, 2017

(54) AUTOMATIC AND SECURE ACTIVATION OF A UNIVERSAL PLUG AND PLAY DEVICE MANAGEMENT DEVICE

(71) Applicant: Verizon Patent and Licensing Inc., Arlington, VA (US)

(72) Inventor: Dayalan Cooppan, Natick, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 278 days.

(21) Appl. No.: 14/284,504

(22) Filed: May 22, 2014

(65) Prior Publication Data

US 2015/0341216 A1   Nov. 26, 2015

(51) Int. Cl.
*H04L 12/24* (2006.01)
*H04L 29/08* (2006.01)

(52) U.S. Cl.
CPC .......... *H04L 41/0816* (2013.01); *H04L 12/24* (2013.01); *H04L 29/08* (2013.01); *H04L 67/104* (2013.01); *H04L 67/125* (2013.01)

(58) Field of Classification Search
CPC ............. H04L 12/2807; H04L 12/2809; H04L 12/2818; H04L 29/06; H04L 29/1232; H04L 41/12; H04L 41/0806; H04L 41/0809; H04L 63/08; H04L 63/101; H04L 63/0823; H04L 67/02; H04L 67/16; H04L 67/34; H04L 12/281; H04L 29/12235; H04L 67/125; H04L 47/2408; H04L 61/2023; H04L 61/2092; H04L 61/3065; H04L 12/24; H04L 12/4633; H04L 29/08; H04L 41/0816; H04L 41/0893; H04L 63/065; H04L 67/10; H04L 67/104;

(Continued)

(56) References Cited

U.S. PATENT DOCUMENTS

2005/0120246 A1* 6/2005 Jang .................... H04L 12/2807 726/4
2005/0267935 A1* 12/2005 Gandhi ............... H04L 29/1232 709/203

(Continued)

OTHER PUBLICATIONS

Lupton, et al., "Manageable Device:1 Device Template Version 1.01", UPnP Specifications, UPnP.org, pp. 1-12, Jul. 2010.*

(Continued)

*Primary Examiner* — Nicholas Taylor
*Assistant Examiner* — Michael Li

(57) ABSTRACT

A device may receive a first device identifier associated with a first device management (DM) device associated with a local area network. The device may identify a second DM device, associated with the local area network, based on receiving the first device identifier. The device may provide the first device identifier to the second DM device. The first device identifier may be provided to the second DM device to allow the first DM device to be managed by the second DM device via the local area network. The device may determine a second device identifier associated with the second DM device. The device may provide the second device identifier to the first DM device. The second device identifier may be provided to the first DM device to allow the second DM device to manage the first DM device via the local area network.

20 Claims, 10 Drawing Sheets

(58) Field of Classification Search
CPC ......... H04L 69/329; H04L 2012/2849; H04W 8/245; G06F 21/12; G06F 21/44; G06F 21/57
See application file for complete search history.

(56) References Cited

U.S. PATENT DOCUMENTS

| | | | | |
|---|---|---|---|---|
| 2007/0254634 | A1* | 11/2007 | Costa-Requena | H04W 8/245 455/412.1 |
| 2009/0132698 | A1* | 5/2009 | Barnhill, Jr. | H04L 12/2809 709/224 |
| 2010/0125652 | A1* | 5/2010 | Rantapuska | H04L 12/2818 709/222 |
| 2012/0203824 | A1* | 8/2012 | Oommen | H04L 41/0809 709/203 |
| 2013/0265910 | A1* | 10/2013 | Hillen | H04L 41/0806 370/255 |

OTHER PUBLICATIONS

Delphinanto, A., et al., "Remote Discovery and Management of End-User Devices in Heterogeneous Private Networks," in Consumer Communications and Networking Conference, 2009. CCCNC 2009. 6th IEEE, vol., No., pp. 1-5, Jan. 10-13, 2009, doi: 10.1109/CCNC.2009.4784889.*
P. Leach et al., "A Universally Unique Identifier (UUID) URN Namespace", http://www.ietf.org/rfc/rfc4122.txt, Jul. 2005, 32 pages.
UPnP Forum, "Device Mangement:2", http://upnp.org/specs/dm/dm2, Jul. 31, 2004, 1 page.
Wikipedia, "TR-069", http://en.wikipedia.org/wiki/TR-069, Apr. 7, 2014, 6 pages.
UPnP Forum, "UPNP Device Management—Simplify the Administration of your devices", http://upnp.org/resources/whitepapers/UPnP%20Device%20Management%20White%20Paper_2011.pdf, Apr. 2011, 18 pages.
Kiran Vedula et al., "Introduction to UPnP Device Management", http://upnp.org/resources/documents/UPnPDMintro_March2012.pdf, Mar. 2012, 13 pages.
Vic Lortz et al., "DeviceProtection:1 Service—Standardized DCP (SDCP)", UPnP Forum Version 1.0, http://www.upnp.org/specs/gw/UPnP-gw-DeviceProtection-v1-Service-20110224.pdf, Feb. 24, 2011, 67 pages.

* cited by examiner

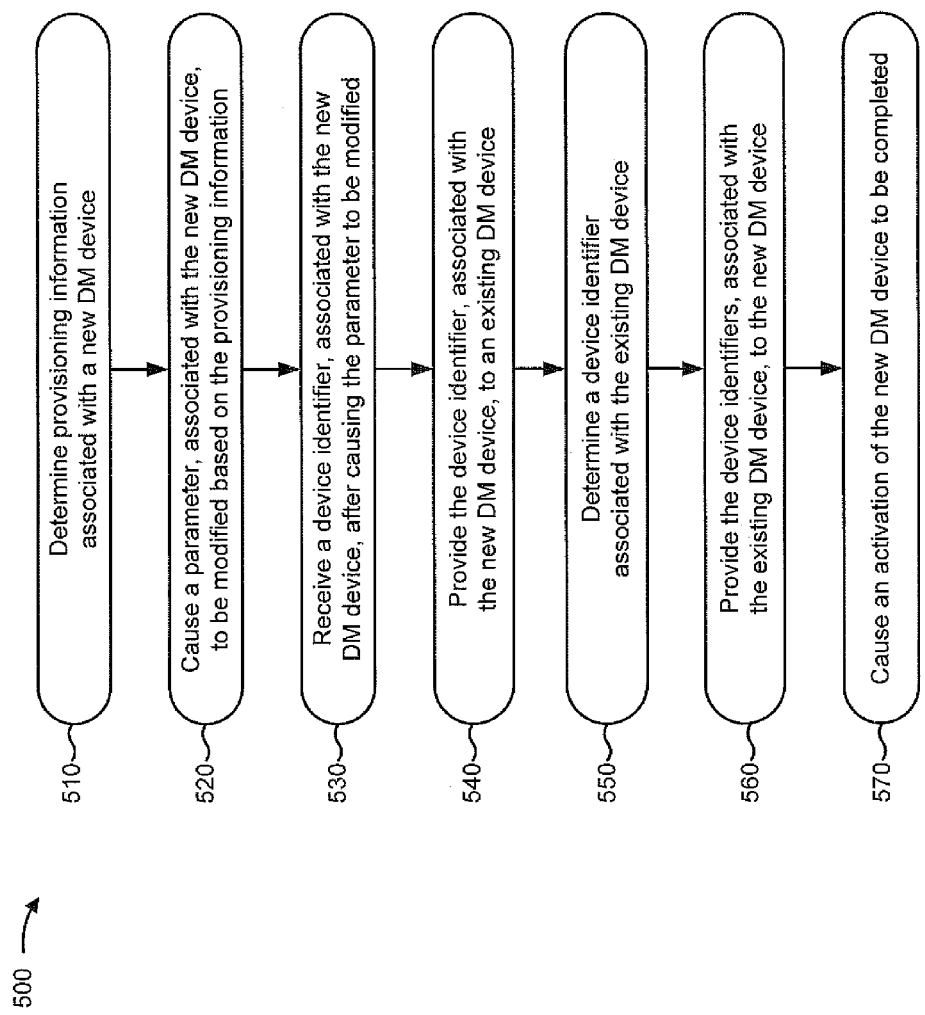

AUTOMATIC AND SECURE ACTIVATION OF A UNIVERSAL PLUG AND PLAY DEVICE MANAGEMENT DEVICE

BACKGROUND

Universal Plug and Play (UPnP) Device Management (DM) is a device control protocol that defines services to address management operations to a UPnP device execution environment. A UPnP DM device may provide control points with a number of capabilities, such as basic management capabilities, configuration management capabilities, software management capabilities, and/or device protection capabilities.

BRIEF DESCRIPTION OF THE DRAWINGS

FIG. 5 is a flow chart of an example process for automatically and securely verifying, configuring, and activating a device management device associated with a service provider to allow the device management device to be locally managed.

DETAILED DESCRIPTION OF PREFERRED EMBODIMENTS

The following detailed description of example implementations refers to the accompanying drawings. The same reference numbers in different drawings may identify the same or similar elements.

A universal plug and play (UPnP) device management (DM) device (hereinafter referred to as a DM device), included in a customer network, may implement a remote management protocol (e.g., based on the Technical Report 069 (TR-069) technical specification) that allows for out-of-band management of the DM device by a service provider. For example, an application associated with managing the DM device may be controlled and/or accessed remotely, by the service provider, using the remote management protocol. Additionally, the service provider may wish for the DM device to exchange information (e.g., diagnostics information, configuration information, etc.) with other DM devices within the customer network to allow the DM device to be locally managed (e.g., via the customer network by one or more of the other DM devices, independent to the operation of TR-069 remote management). However, verifying, configuring, and/or activating the DM device to allow for local management may require human interaction by the customer, by a technician associated with the service provider, etc. Implementations described herein may allow a DM device, associated with a customer network, to be automatically (e.g., zero-touch, without human interaction, without human intervention, etc.) verified, configured, and activated (e.g., using a remote management protocol) to allow the DM device to communicate with other DM devices, associated with the customer network, such that the DM device may be managed via the customer network.

Figure 1A:
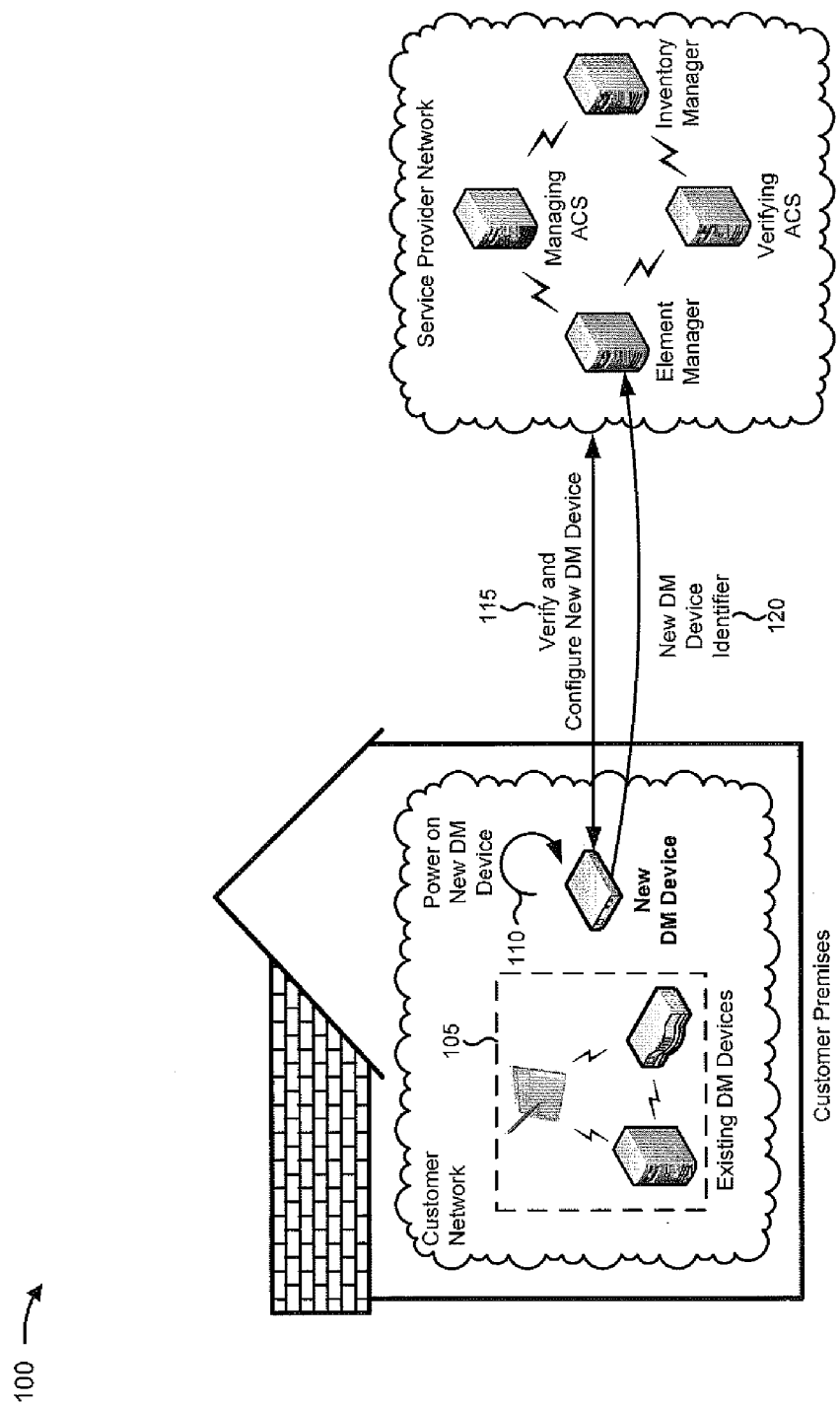
FIGS. 1A-1C are diagrams of an overview of an example implementation described herein.
Figure 1B:
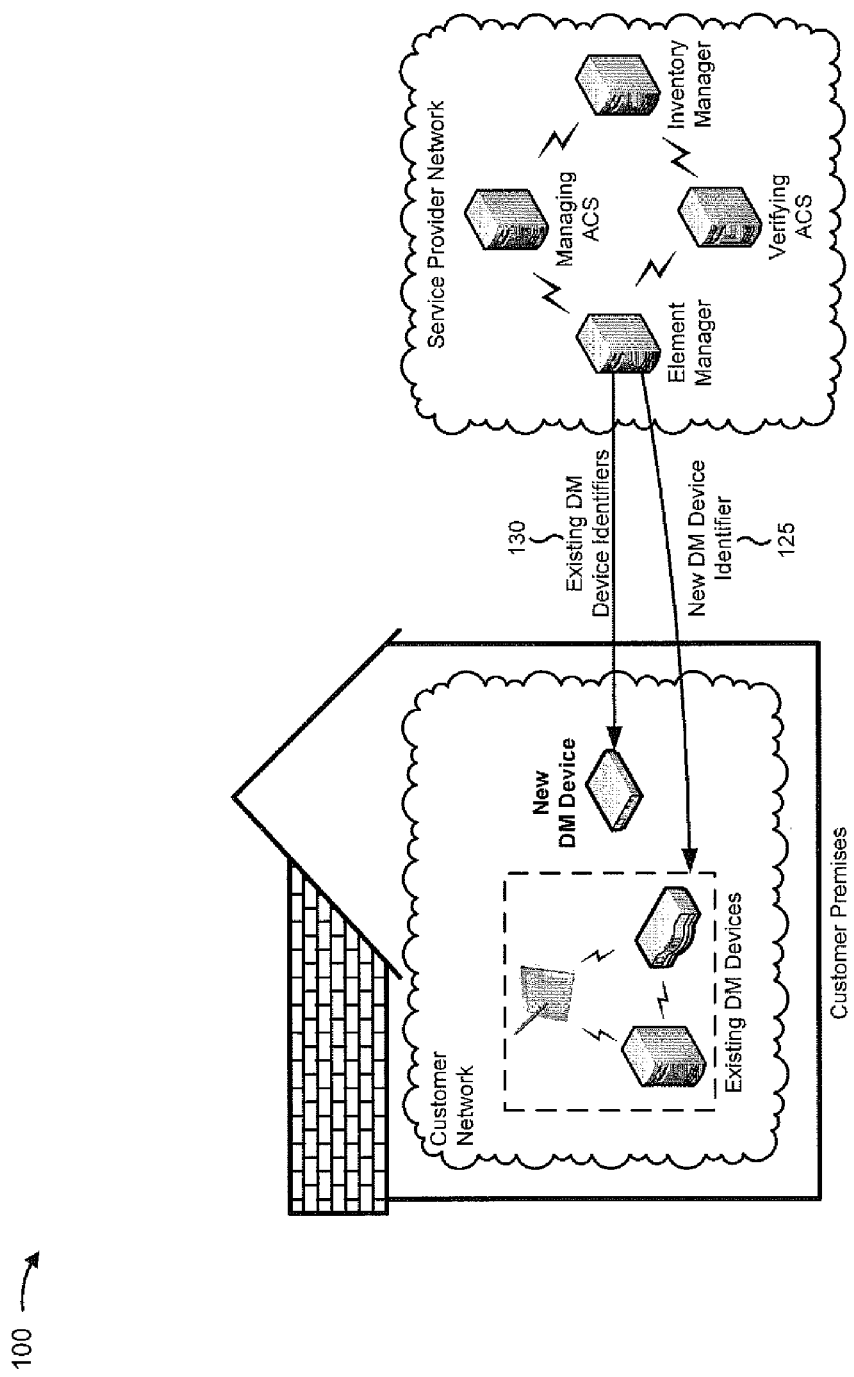
Figure 1C:
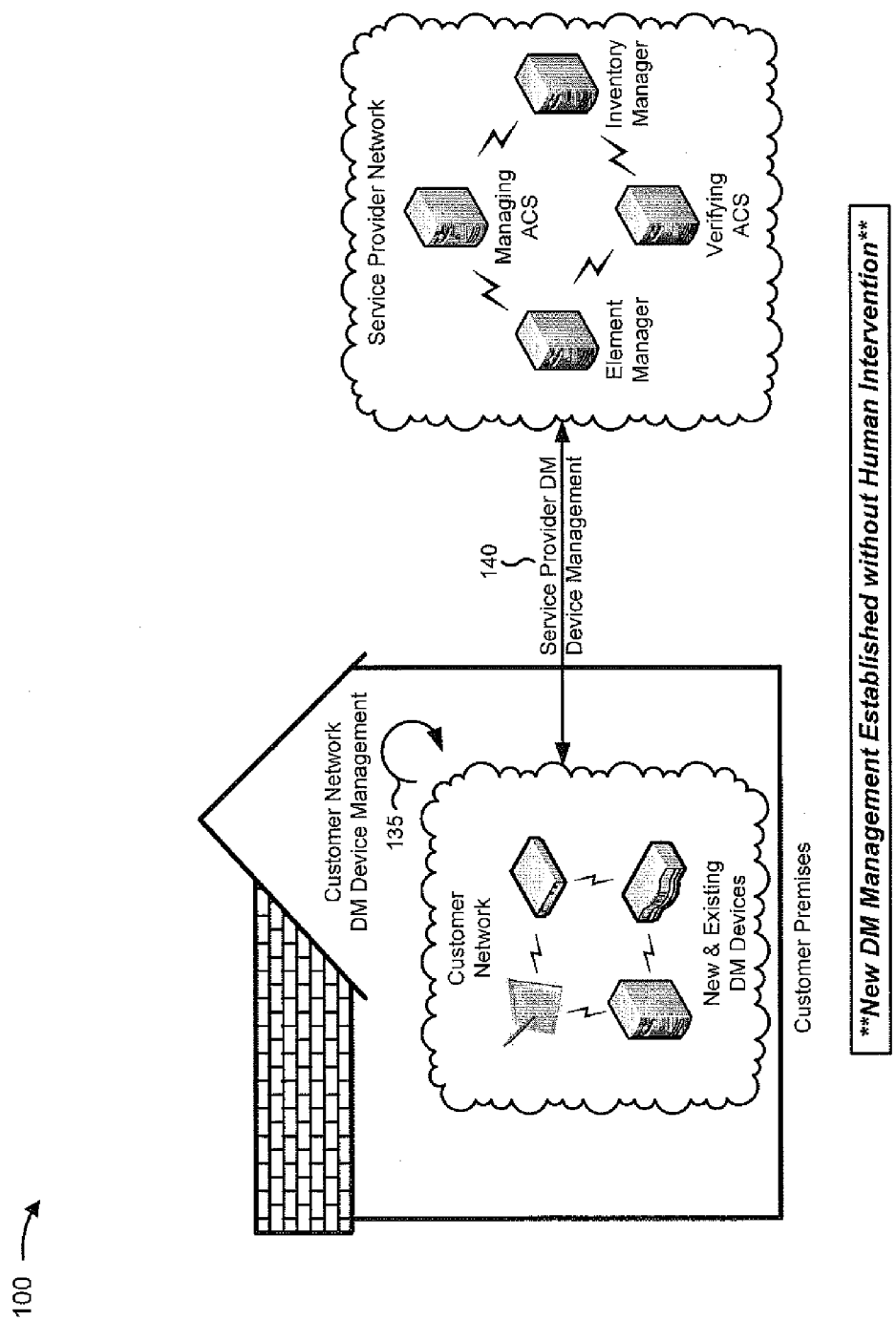

FIGS. 1A-1C are diagrams of an overview of an example implementation 100 described herein. For the purposes of example implementation 100, assume that a group of existing DM devices, associated with a service provider and included in a customer network, are configured such that each of the existing DM devices may communicate with each of the other existing DM devices (e.g., such that the existing DM devices may be locally managed). Further, assume that the customer has obtained a new DM device, and that the customer wishes for the new DM device to be configured and activated to allow the new DM device to communicate with the existing DM devices (e.g., media devices, client devices, mobile devices, network devices, etc.) via the customer network (e.g., such that the new DM device and the existing DM devices may be locally managed).

As shown in FIG. 1A, and by reference number 105, the existing DM devices may be configured to communicate with each other via the customer network, whereas the new DM device may not be permitted to communicate with the existing DM devices via the customer network (e.g., since the new DM device has not been verified, configured, or activated). As shown by reference number 110, the customer may initially power on the new DM device. As shown by reference number 115, the new DM device may communicate (e.g., via the customer network and/or a service provider network), using a remote management protocol, with one or more service provider network devices (e.g., an element manager, a verifying auto-configuration server (ACS), a managing ACS, an inventory manager) to verify the new DM device and configure the new DM device. As shown by reference number 120 and after being verified and configured, the new DM device may provide a device identifier (e.g., a universal unique identifier), associated with the new DM device, to the element manager included in the service provider network (e.g., to initiate activation of the new DM device).

As shown in FIG. 1B, and by reference number 125, the element manager may provide, to the group existing DM devices, the device identifier associated with the new DM device. As shown by reference number 130, the element manager may also provide a set of device identifiers, corresponding to the group of existing devices, to the new DM device (e.g., when the set of device identifiers is stored by a device included in the service provider network) in order to activate the new DM device.

As shown in FIG. 1C, and by reference number 135, the new DM device may communicate with the group of existing DM devices via the customer network (e.g., based on the new DM device receiving the set of identifiers corresponding to the set of existing DM devices, and based on the set of existing DM devices receiving the identifier associated with the new DM device) such that each of the DM devices may be locally managed (e.g., by another DM device) and/or exchange information (e.g., on an ongoing basis) with other DM devices via the customer network. As shown by reference number 140, the service provider may also be capable of remotely managing the new DM device and the existing DM devices.

In this way, a DM device, associated with a customer network, may be automatically (e.g., without human intervention) verified, configured, and activated to allow the DM device to communicate with other DM devices, associated with the customer network, such that the DM device may be locally managed via the customer network.

Figure 2:
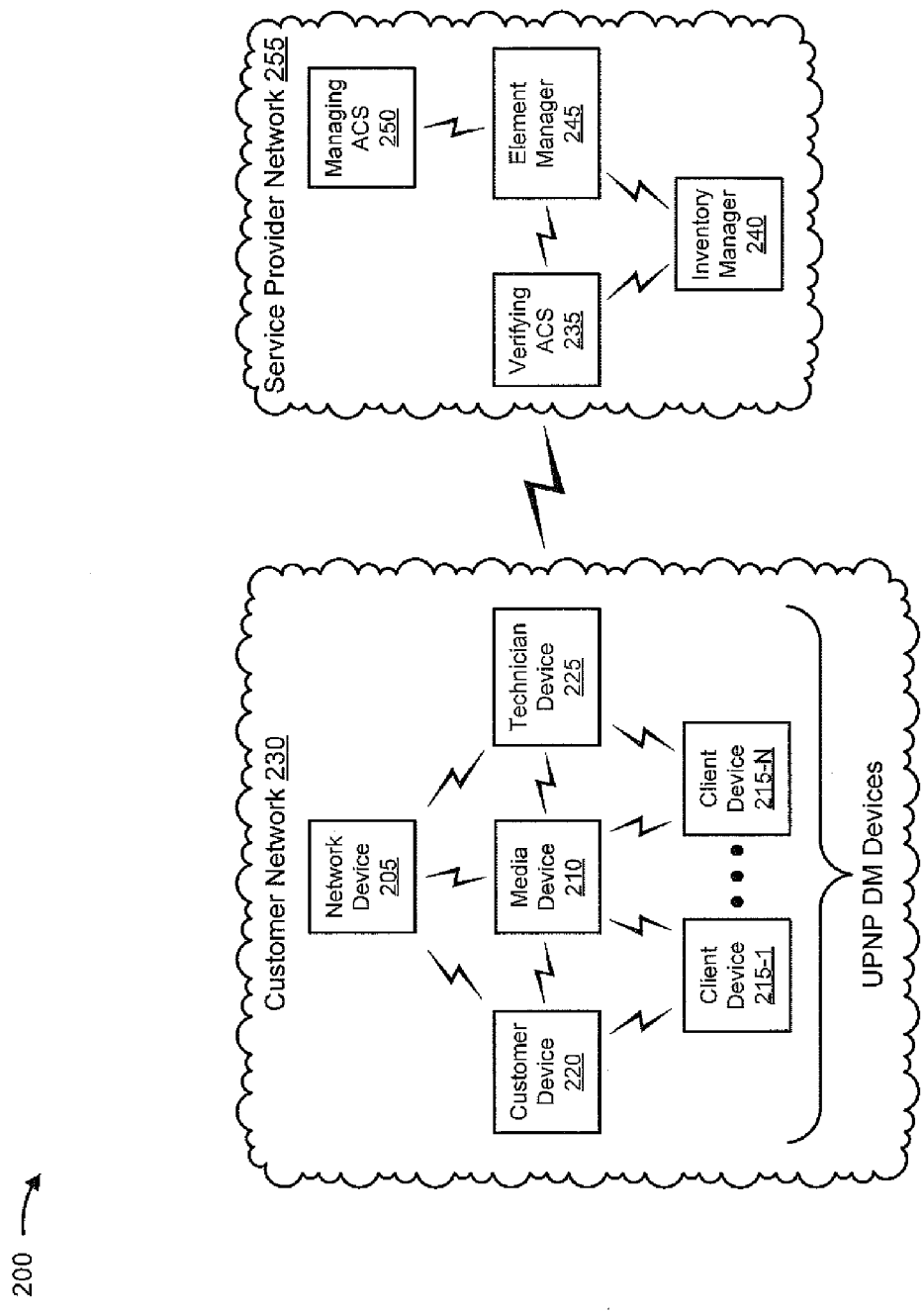
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a network device 205, a media device 210, one or more client devices 215-1 through 215-N (N≥1) (hereinafter referred to collectively as client devices 215, and individually as client device 215), a customer device 220, a technician device 225, a customer network 230, a verifying auto-configuration server (ACS) 235, an inventory manager 240, an element manager 245, a managing ACS 250, and a server provider network 255. Devices of environment 200 may interconnect via wired connections, wireless connections, or a combination of wired and wireless connections.

Network device 205 may include a device capable of providing network connectivity and/or capable of routing packets. For example, network device 205 may include one or more data processing and/or traffic transfer devices, such as a router, a gateway, a modem, a switch, a firewall, a network interface card (NIC), a hub, a bridge, an optical add/drop multiplexer (OADM), or another type of device that processes and/or transfers traffic. In some implementations, network device 205 may be capable of receiving information from and/or transmitting information to another device included in environment 200. In some implementations, network device 205 may be a manageable DM device, as discussed below.

Media device 210 may include a device capable of receiving, generating processing, storing, and/or providing media content, and providing the media content to a customer (e.g., via a display device, via client device 215). Examples of media device 210 may include a set-top box, a casting stick (e.g., a high-definition media interface (HDMI) dongle), a computer, a cable card, a gaming device, a digital video recorder or player, a portable electronic device, a gateway, a router, and/or another type of device capable of receiving, transmitting, and/or processing media content and providing the media content. In some implementations, media device 210 may be capable of receiving and/or transmitting the media content from and/or to another device included in environment 200, such as network device 205 and/or client device 215. In some implementations, media device 210 may provide media content to one or more client devices 215. In some implementations, media device 210 may be a manageable DM device and/or a control point DM device, as discussed below.

Client device 215 may include a device capable of receiving, generating processing, and/or storing information (e.g., media content), and providing the information to a customer (e.g., via a display device). Examples of client device 215 may include a set-top box, a casting stick (e.g., an HDMI dongle), a television, a tablet computer, a computer, a cable card, a gaming device, a portable electronic device, and/or another type of device capable of receiving, and/or processing media content. In some implementations, client device 215 may be capable of receiving media content from media device 210, and providing (e.g., for display via a display device) the media content. In some implementations, one or more client devices 215 may receive media content from a single media device 210. In some implementations, one or more client devices 215 my receive media content from multiple media devices 210. In some implementations, client device 215 may be a manageable DM device and/or a control point DM device, as discussed below.

Customer device 220 may include a device, associated with a customer, capable of receiving, generating, storing, processing, and/or providing information, such as information associated with managing one or more DM devices included in customer network 230. For example, customer device 220 may include a tablet computer, a handheld computer, a mobile phone (e.g., a smart phone, a radiotelephone, etc.), a desktop computer, a laptop computer, or a similar device. In some implementations, customer device 220 may host an application that allows the customer to manage (e.g., with limited management capabilities) one or more DM devices via customer network 230. In some implementations, customer device 220 may be a control point DM device, as discussed below.

Technician device 225 may include a device, associated with a service provider (e.g., a device carried by a technician employed by the service provider), capable of receiving, generating, storing, processing, and/or providing information, such as information associated with managing one or more DM devices included in customer network 230. For example, technician device 225 may include a tablet computer, a handheld computer, a mobile phone, a desktop computer, a laptop computer, or a similar device. In some implementations, technician device 225 may be capable of communicating with DM devices, included in customer network 230, to allow the service provider to manage one or more DM devices included in customer network 230 (e.g., when the technician is located on the customer premises). In some implementations, technician device 225 may be a control point DM device, as discussed below.

In some implementations, network device 205, media device 210, and/or client device 215 may act as a manageable DM device. A manageable DM device may include a UPnP DM device that is capable of being managed by a control point DM device. Additionally, or alternatively, media device 210, client device 215, customer device 220, and/or technician device 225 may act as a control point DM device. A control point DM device may include a UPnP DM device that is capable of managing a manageable DM device. In some implementations, a particular DM device (e.g., media device 210, client device 215) may act as both a manageable DM device and a control point DM device. Alternatively, the particular DM device may act only as a manageable DM device (e.g., network device 205) or a control point DM device (e.g., customer device 220, technician device 225).

Customer network 230 may include one or more wired and/or wireless networks associated with a customer premises. For example, customer network 230 may include a wireless local area network (WLAN) (e.g., a Wi-Fi network), a local area network (LAN), a private network, a multimedia over coaxial (MoCA) network, an ad hoc network, an intranet, a fiber optic-based network, and/or a combination of these or other types of networks.

Verifying ACS 235 may include a device capable of verifying a DM device. For example, verifying ACS 235 may include a server device or a collection of server devices that use a remote management protocol to communicate with a DM device to verify the DM device. In some implementations, verifying ACS 235 may be capable of receiving and/or transmitting verification information from and/or to another device, such as inventory manager 240. In some implementations, verifying ACS 235 may be capable configuring a DM device by causing (e.g., via element manager 245) one or more parameters of the DM device to be modified to allow the DM device to be activated and/or managed by another device, such as managing ACS 250.

Inventory manager 240 may include a device capable of receiving, generating, processing, storing, and/or providing information associated with a DM device, such as provisioning information associated with the DM device. For example, inventory manager 240 may include a server device and/or a group of server devices. In some implementations, inventory manager 240 may communicate with verifying ACS 235, element manager 245, and/or managing ACS 250 in order to receive and/or provide information associated with configuring, activating, and/or managing a DM device. In some implementations, inventory manager 240 may store information associated with a DM device, associated with a customer, such as a serial number, a media access control (MAC) address, a model of the DM device, a type of the DM device, and/or another type of information.

Element manager 245 may include a device capable of receiving, generating, processing, storing, and/or providing information associated with a DM device in order to activate, configure, and/or manage the DM device. For example, element manager 245 may include a server or a collection of servers. In some implementations, element manager 245 may act as a broker between verifying ACS 235, managing ACS 250, and/or a DM device such that the DM device may be activated, configured, and/or managed via element manager 245.

Managing ACS 250 may include a device capable of managing a DM device. For example, managing ACS 250 may include a server device or a collection of server devices that use a remote management protocol to communicate with a DM device. In some implementations, managing ACS 250 may be capable of receiving and/or transmitting information, associated with managing a DM device, to and/or from another device, such as the DM device and/or element manager 245.

Server provider network 255 may include one or more wired and/or wireless networks associated with a service provider. For example, service provider network 255 may include a cellular network (e.g., an LTE network, a third generation (3G) network, a code division multiple access (CDMA) network, etc.), a public land mobile network (PLMN), a wireless local area network, a LAN, a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
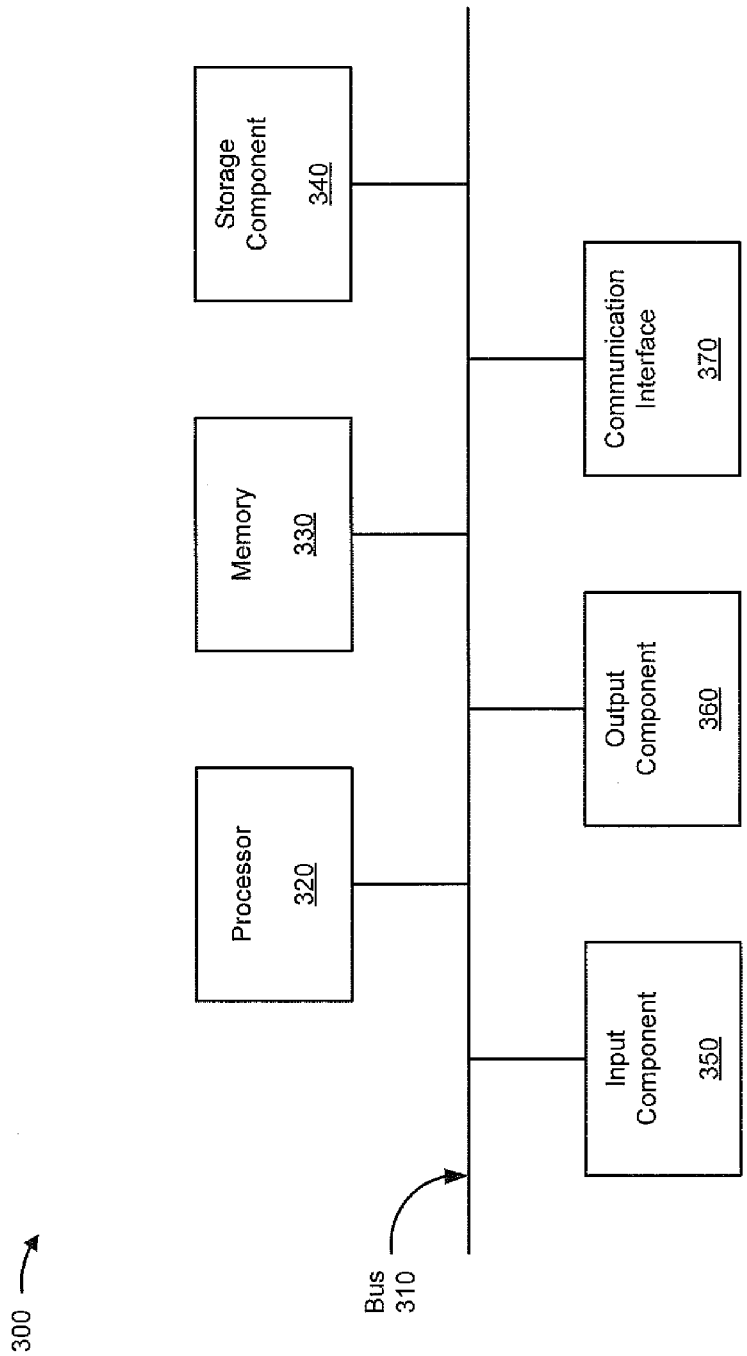
FIG. 3 is a diagram of example components of one or more devices of FIG. 2.

FIG. 3 is a diagram of example components of a device 300. Device 300 may correspond to network device 205, media device 210, client device 215, customer device 220, technician device 225, verifying ACS 235, inventory manager 240, element manager 245, and/or managing ACS 250. In some implementations, network device 205, media device 210, client device 215, customer device 220, technician device 225, verifying ACS 235, inventory manager 240, element manager 245, and/or managing ACS 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
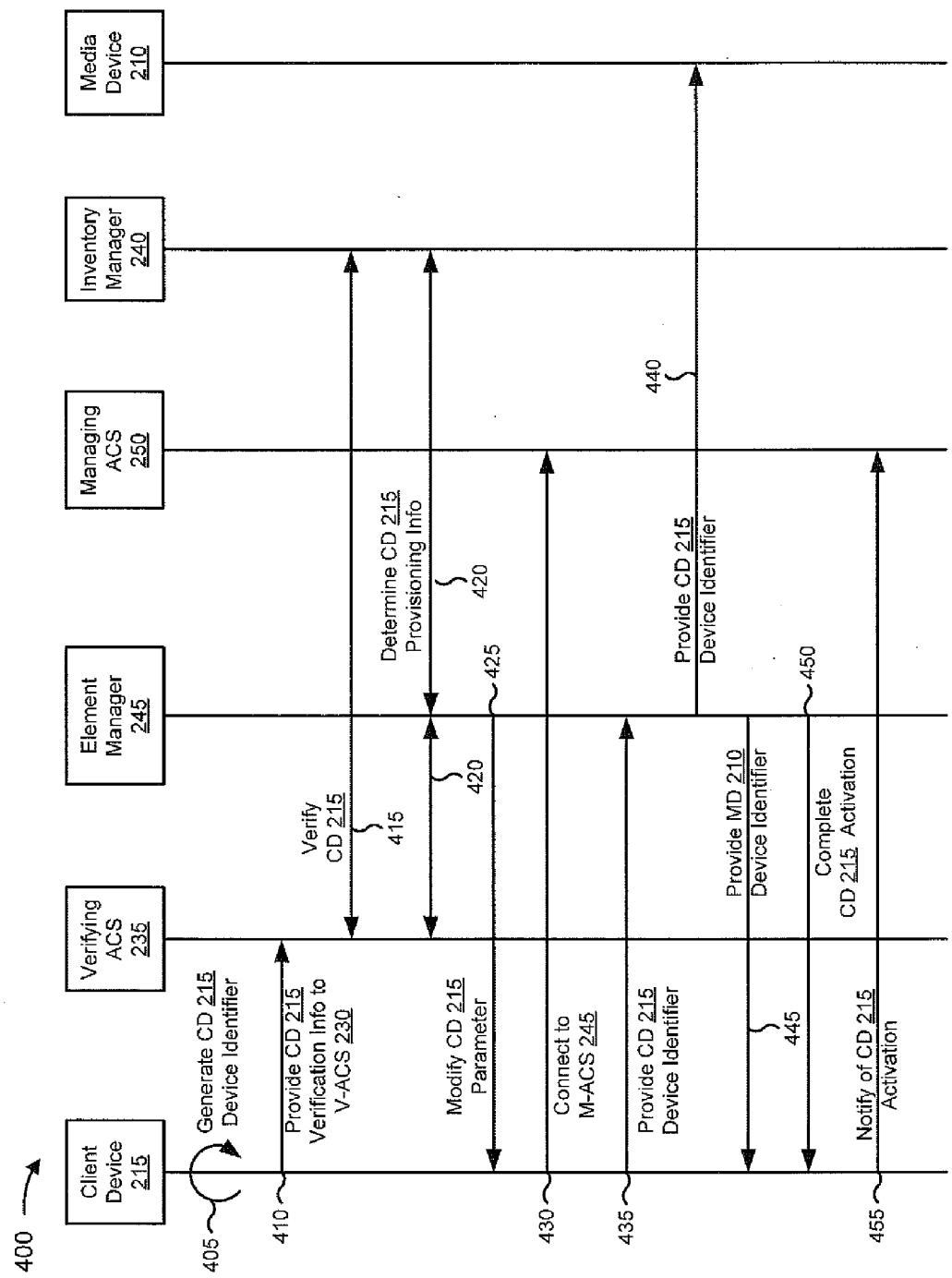
FIG. 4 is a call flow diagram of an example process for automatically and securely verifying, configuring, and activating a device management device associated with a service provider to allow the device management device to be locally managed.

FIG. 4 is a call flow diagram of an example process 400 for automatically and securely verifying, configuring, and activating a device management (DM) device associated with a service provider to allow the DM device to be locally managed. In some implementations, one or more operations of FIG. 4 may be performed by one or more devices included in environment 200. While example process 400 describes client device 215 acting as a new DM device (e.g., a new manageable DM device), in some implementations, the new DM device described in process 400 may be network device 205, media device 210, customer device 220, or technician device 225 that is to act as a new manageable DM device and/or a new control point DM device. Similarly, while example process 400 describes media device 210 as an existing DM device (e.g., an existing control point DM device), in some implementations, the existing DM device associated with process 400 may include another device and/or combination of devices, such as media device 210, another client device 215, customer device 220, and/or technician device 225 that act as existing control point devices.

As shown in FIG. 4, process 400 may include generating a device identifier associated with a new DM device (shown at reference number 405). For example, client device 215 (e.g., the new DM device) may generate a device identifier associated with client device 215. In some implementations, client device 215 may generate the device identifier, associated with client device 215, after client device 215 is initially powered on at a customer premises. Additionally, or alternatively, client device 215 may generate the device identifier when client device 215 receives information, indicating that client device 215 is to generate the device identifier, from another device (e.g., when client device 215 receives an indication to perform a factory reset, etc.).

A device identifier may include information that identifies a DM device (e.g., a UPnP DM device) that implements a security functionality (e.g., a DeviceProtection service) associated with protecting information and/or UPnP control operations (e.g., associated with managing the DM device) that are to be protected from unauthorized access. For example, the device identifier may include a universally unique identifier (e.g., UUID) that may be generated by applying a hash function to a public key infrastructure certificate (e.g., an X.509 certificate) associated with the DM device. Additionally, or alternatively, the device identifier may include another type of identifier, such as a secure sockets layer (SSL) identification number associated with the public key infrastructure certificate.

In some implementations, client device 215 may generate the device identifier based on information stored by client device 215 (e.g., when client device 215 stores the X.509 certificate associated with the device). Additionally, or alternatively, client device 215 may generate the device identifier based on information provided by another device. Additionally, or alternatively, client device 215 may generate the device identifier by reading the device identifier from a memory location (e.g., a secure memory location) of client device 215. In some implementations, the device identifier may be provided to media device 210 (e.g., the existing DM device) to allow client device 215 to communicate with media device 210 via customer network 230, as discussed below.

As further shown in FIG. 4, process 400 may include providing verification information, associated with the new DM device, to a verifying ACS associated with the new DM device (shown at reference number 410). For example, client device 215 may provide verification information, associated with client device 215, to verifying ACS 235 associated with client device 215. In some implementations, client device 215 may provide the verification information to verifying ACS 235 after client device 215 generates the device identifier. Additionally, or alternatively, client device 215 may (e.g., automatically) provide the verification information to verifying ACS 235 after client device 215 is initially powered on at a customer premises.

Verification information, associated with a DM device, may include information that may be used to verify that the DM device is associated with the service provider. For example, the verification information may include connection information (e.g., an IP address used to identify a customer of the service provider, etc.), identification information (e.g., a serial number of client device 215, a certificate ID of client device 215, etc.), and/or another type of information that may be used to verify client device 215. In some implementations, the verification information may also include information associated with health checking a connection associated with client device 215, such as signal strength information (e.g., a MoCA signal strength level) associated with client device 215. In some implementations, the verification information may be included in firmware of client device 215 (e.g., the serial number, the certificate ID, etc.). Additionally, or alternatively, client device 215 may determine the verification information (e.g., the IP address used to identify the customer).

In some implementations, client device 215 may provide the verification information to verifying ACS 235 based on information stored by client device 215. For example, client device 215 may store location information (e.g., a uniform resource locator (URL), a network address, etc.) that identifies verifying ACS 235, and client device 215 may provide the verification information to verifying ACS 235 based on the location information. In some implementations, client device 215 may be configured to provide the verification information to verifying ACS 235 before client device 215 is permitted to communicate with another device included in service provider network 255 in order to verify that client device 215 is associated with the service provider (e.g., to verify that client device 215 is a DM device supplied by the service provider) or a DM device permitted to communicate with service provider network 255. In some implementations, client device 215 may communicate (via customer network 230 and service provider network 255) with devices included in service provider network 255 using a remote management protocol that allows for out-of-band communication between client device 215 and one or more devices included in service provider network.

As further shown in FIG. 4, process 400 may include verifying the new DM device (shown at reference number 415). For example, verifying ACS 235 may verify client device 215. In some implementations, verifying ACS 235 may verify client device 215 after client device 215 provides the verification information, associated with client device 215, to verifying ACS 235.

In some implementations, verifying ACS 235 may verify client device 215 based on information stored by inventory manager 240. For example, assume that inventory manager 240 stores a serial number that identifies client device 215 that is to be shipped to the customer. Further, assume that inventory manager 240 stores an IP address used to identify the customer. In this example, verifying ACS 235 may receive the verification information (e.g., including a serial number and an IP address), and may query inventory manager 240 to determine that the serial number and the IP address, included in the verification information, matches the serial number and the IP address stored by inventory manager 240. Additionally, or alternatively, verifying ACS 235 may verify client device 215 in another manner and/or based on other information associated with client device 215 and/or stored by inventory manager 240.

If verifying ACS 235 is unable to verify client device 215 (e.g., when the serial number and the IP address, included in the verification information, do not match the serial number and the IP address stored by inventory manager 240), then process 400 may cease and client device 215 may not be activated, configured, and/or managed.

As further shown in FIG. 4, process 400 may include determining provisioning information associated with the new DM device (shown at reference number 420). For example, element manager 245 may determine provisioning information associated with client device 215. In some implementations, element manager 245 may determine the provisioning information after verifying ACS 235 verifies the client device. Additionally, or alternatively, element manager 245 may determine the provisioning information based on receiving information, indicating that element manager 245 is to determine the provisioning information, from another device, such as verifying ACS 235.

Provisioning information, associated with a DM device, may include information associated with activating, configuring, and/or managing the DM device. For example, the provisioning information may include location information associated with managing ACS 250 that is to manage client device 215 (e.g., a URL, a network address, etc.), login information to be assigned to client device 215 (e.g., a username, a password, etc.), information associated with activating client device 215, information associated with other DM devices associated with customer network 230, and/or another type of information. In some implementations, element manager 245 may determine the provisioning information based on information stored by inventory manager 240. For example, inventory manager 240 may store information identifying managing ACS 250 that manages media device 210 (e.g., the existing DM device associated with the customer), and element manager 245 may determine that client device 215 is to be managed by the same managing ACS 250. Additionally, or alternatively, element manager 245 may determine the provisioning information based on the verification information (e.g., when verifying ACS 235 provides the verification information to element manager 245).

As further shown in FIG. 4, process 400 may include causing a parameter, associated with the new DM device, to be modified based on the provisioning information (shown at reference number 425). For example, element manager 245 may cause a parameter, associated with client device 215, to be modified based on the provisioning information. In some implementations, element manager 245 may cause the parameter, associated with client device 215, to be modified after element manager 245 determines the provisioning information.

In some implementations, element manager 245 may cause the parameter to be modified to cause client device 215 to communicate with managing ACS 250 identified in the provisioning information such that client device 215 may be managed by managing ACS 250. For example, the provisioning information may include a URL and/or authentication credentials unique to client device 215 that identifies managing ACS 250 that is to manage client device 215, and element manager 245 may modify a parameter of client device 215 such that client device 215 is configured to communicate with managing ACS 250 identified in the provisioning information. Additionally, or alternatively, element manager 245 may modify a parameter that causes client device 215 to periodically (e.g., every 3 hours, every 24 hours, etc.) provide information (e.g., connection health information, diagnostics information, configuration information, etc.) to managing ACS 250. In some implementations, element manager 245 may cause the parameter to be modified by modifying the parameter. Additionally, or alternatively, element manager 245 may cause the parameter to be modified by instructing another device (e.g., verifying ACS 235) to modify the parameter.

As further shown in FIG. 4, process 400 may include connecting to a managing ACS based on the modified parameter (shown at reference number 430). For example, client device 215 may connect to managing ACS 250 based on the modified parameter associated with client device 215. In some implementations, client device 215 may connect to managing ACS 250 after element manager 245 modifies the parameter associated with client device 215.

In some implementations, client device 215 may connect to managing ACS 250 based on the modified parameter. For example, the modified parameter may include location information (e.g., a URL) associated with managing ACS 250, and client device 215 may connect to managing ACS 250 based on the location information. In some implementations, client device 215 may connect to managing ACS 250 in order to initiate an activation of client device 215. At this point, client device 215 has been verified and has been configured to be managed by managing ACS 250, and client device 215 may now be activated to allow client device 215 to communicate with media device 210 (e.g., the existing DM device included in customer network 230) via customer network 230.

As further shown in FIG. 4, process 400 may include providing the device identifier associated with the new DM device (shown at reference number 435). For example, client device 215 may provide the device identifier, associated with client device 215, to element manager 245. In some implementations, client device 215 may provide the device identifier to element manager 245 after client device 215 connects to managing ACS 250. Additionally, or alternatively, client device 215 may provide the device identifier to element manager 245 after client device 215 generates the device identifier.

In some implementations, element manager 245 may store the device identifier, associated with client device 215 (e.g., such that element manager 245 may retrieve the device identifier at a later time). Additionally, or alternatively, element manager 245 may provide the device identifier to inventory manager 240 and/or managing ACS 250 for storage.

As further shown in FIG. 4, process 400 may include providing the device identifier associated with the new DM device to the existing DM device (shown at reference number 440). For example, element manager 245 may provide the device identifier, associated with client device 215, to media device 210 (e.g., the existing DM device). In some implementations, element manager 245 may provide the device identifier, associated with client device 215, after element manager 245 receives the client device identifier from client device 215. Additionally, or alternatively, element manager 245 may provide the client device identifier when element manager 245 receives information, indicating that element manager 245 is to provide the client device identifier, from another device, such as managing ACS 250.

In some implementations, element manager 245 may identify media device 210 before providing the client device identifier. For example, element manager 245 may query inventory manager 240 to determine location information (e.g., IP addresses) associated with existing DM devices associated with the customer. In this example, inventory manager 240 may identify the location information associated with media device 210, and inventory manager 240 may provide location information to element manager 245. Additionally, or alternatively, element manager 245 may identify media device 210 based on the provisioning information determined by element manager 245 (e.g., when the provisioning information includes the location information associated with media device 210).

In some implementations, element manager 245 may provide the client device identifier to media device 210 to allow media device 210 to communicate with client device 215 via customer network 230. For example, element manager 245 may provide the client device identifier to media device 210, and media device 210 may modify a parameter, associated with media device 210, to permit media device 210 to communicate with client device 215 via customer network 230.

As further shown in FIG. 4, process 400 may include providing a device identifier, associated with the existing DM device, to the new DM device (shown at reference number 445). For example, element manager 245 may provide a device identifier, associated with media device 210 (e.g., a media device identifier), to client device 215. In some implementations, element manager 245 may provide the media device identifier when element manager 245 provides the client device identifier to media device 210. Additionally, or alternatively, element manager 245 may provide the media device identifier after element manager 245 determines the media device 210 identifier, as discussed below.

In some implementations, element manager 245 may determine the media device identifier before providing the media device identifier. For example, element manager 245 may query inventory manager 240 to determine device identifiers of existing DM devices associated with the customer. In this example, inventory manager 240 may determine (e.g., based on information stored by inventory manager 240) that media device 210 is associated with the customer (e.g., included in customer network 230), and inventory manager 240 may provide the media device identifier to element manager 245. Additionally, or alternatively, element manager 245 may determine the media device identifier based on the provisioning information determined by element manager 245 (e.g., when the provisioning information includes the media device identifier).

In some implementations, element manager 245 may provide the media device identifier to client device 215 to allow media device 210 to communicate with client device 215 via customer network 230. For example, element manager 245 may provide the media device identifier to client device 215, and client device 215 may modify a parameter, associated with client device 215, to permit client device 215 to communicate with media device 210 via customer network 230.

In this way, the new DM device (e.g., client device 215), associated with a customer, may be automatically (e.g., without user intervention) activated, using a remote management protocol (e.g., based on the TR-069 technical specification), such that the new DM device may communicate with an existing DM device (e.g., media device 210) via customer network 230. For example, media device 210 (e.g., acting as a control point DM device) may communicate with client device 215 (e.g., acting as a manageable DM device) in order to manage client device 215. In some implementations, the customer may use media device 210 to locally manage client device 215. For example, media device 210 may allow the customer to view diagnostic information associated with client device 215, troubleshoot client device 215, restart client device 215, etc. via customer network 230.

In some implementations, communications between client device 215 and media device 210 may be over an SSL link and/or a transport layer security (TLS) link using the client device identifier and/or the media device identifier associated with the DM devices. For example, media device 210 may send a request, via SSL/TLS link and customer network 230, for diagnostic information, associated with client device 215, that includes the media device identifier. In this example, client device 215 may determine, based on the media device identifier included in the request, that client device 215 may provide the diagnostic information to media device 210 since client device 215 stores information identifying media device 210 as a device that is permitted to manage client device 215.

As further shown in FIG. 4, process 400 may include causing the activation of the new DM device to be completed (shown at reference number 450). For example, element manager 245 may cause the activation of client device 215 to be completed. In some implementations, element manager 245 may cause the activation of client device 215 to be completed after element manager 245 provides the client device identifier to media device 210. Additionally, or alternatively, element manager 245 may cause the activation of client device 215 to be completed after element manager 245 provides the media device identifier to client device 215.

In some implementations, element manager 245 may cause the activation to be completed based on a issuing a command to client device 215. For example, element manager 245 may cause the activation of client device 215 to be completed by issuing, to client device 215, a command indicating that client device 215 is to restart. In this example, client device 215 may receive the command and may restart in order to complete the activation. Additionally, or alternatively, element manager 245 may cause the activation of client device 215 to be completed in another manner and/or by providing other information to client device 215.

As further shown in FIG. 4, process 400 may include notifying the managing ACS that the new DM device has been activated (shown at reference number 455). For example, client device 215 may notify managing ACS 250 that client device 215 has been activated. In some implementations, client device 215 may notify managing ACS 250 that client device 215 has been activated after element manager 245 causes the activation of client device 215 to be completed (e.g., after client device 215 restarts).

In some implementations, client device 215 may notify managing ACS 250 that client device 215 has been activated to allow managing ACS 250 to remotely manage client device 215. For example, client device 215 may notify managing ACS 250 that client device 215 has been activated, and the service provider may (e.g., via managing ACS 250 and/or element manager 245) interrogate client device 215, troubleshoot client device 215, determine customer network 230 information via client device 215, reconfigure client device 215, reset client device 215, and/or remotely manage client device 215 in another manner.

Although FIG. 4 shows example operations of process 400, in some implementations, process 400 may include additional operations, fewer operations, different operations, or differently arranged operations than those depicted in FIG. 4. Additionally, or alternatively, two or more of the operations of process 400 may be performed in parallel.

FIG. 5 is a flow chart of an example process 500 for automatically and securely verifying, configuring, and activating a device management (DM) device associated with a service provider to allow the DM device to be locally managed. In some implementations, one or more process blocks of FIG. 5 may be performed by element manager 245. Additionally, or alternatively, one or more process blocks of FIG. 5 may be performed by another device or a group of devices separate from or including element manager 245, such as verifying ACS 230 and/or managing ACS 250. While example process 500 describes client device 215 acting as a new DM device (e.g., a new manageable DM device), in some implementations, the new DM device described in process 500 may be network device 205, media device 210, customer device 220, or technician device 225 that is to act as a new manageable DM device and/or a new control point DM device. Similarly, while example process 500 describes media device 210 as an existing DM device (e.g., an existing control point DM device), in some implementations, the existing DM device associated with process 500 may include another device and/or combination of devices, such as media device 210, another client device 215, customer device 220, and/or technician device 225 that act as existing control point devices.

As shown in FIG. 5, process 500 may include determining provisioning information associated with a new DM device (block 510). For example, managing device 245 may determine provisioning information associated with client device 215, as discussed above.

As further shown in FIG. 5, process 500 may include causing a parameter, associated with the new DM device, to be modified based on the provisioning information (block 520). For example, managing device 245 may cause a parameter (e.g., one or more parameters), associated with client device 215, to be modified based on the provisioning information, as discussed above.

As further shown in FIG. 5, process 500 may include receiving a device identifier, associated with the new DM device, after causing the parameter to be modified (block 530). For example, managing device 245 may receive a device identifier, associated with client device 215, after causing the parameter, associated with client device 215, to be modified, as discussed above.

As further shown in FIG. 5, process 500 may include providing the device identifier, associated with the new DM device, to an existing DM device (block 540). For example, managing device 245 may provide the device identifier, associated with client device 215, to media device 210, as discussed above.

As further shown in FIG. 5, process 500 may include determining a device identifier, associated with the existing DM device (block 550). For example, managing device 245 may determine a device identifier associated with media device 210, as discussed above.

As further shown in FIG. 5, process 500 may include providing the device identifier, associated with the existing DM device, to the new DM device (block 560). For example, managing device 245 may provide the device identifier, associated with media device 210, to client device 215, as discussed above.

As further shown in FIG. 5, process 500 may include causing the activation of the new DM device to be completed (block 570). For example, managing device 245 may cause the activation of client device 215 to be completed, as discussed above.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6A:
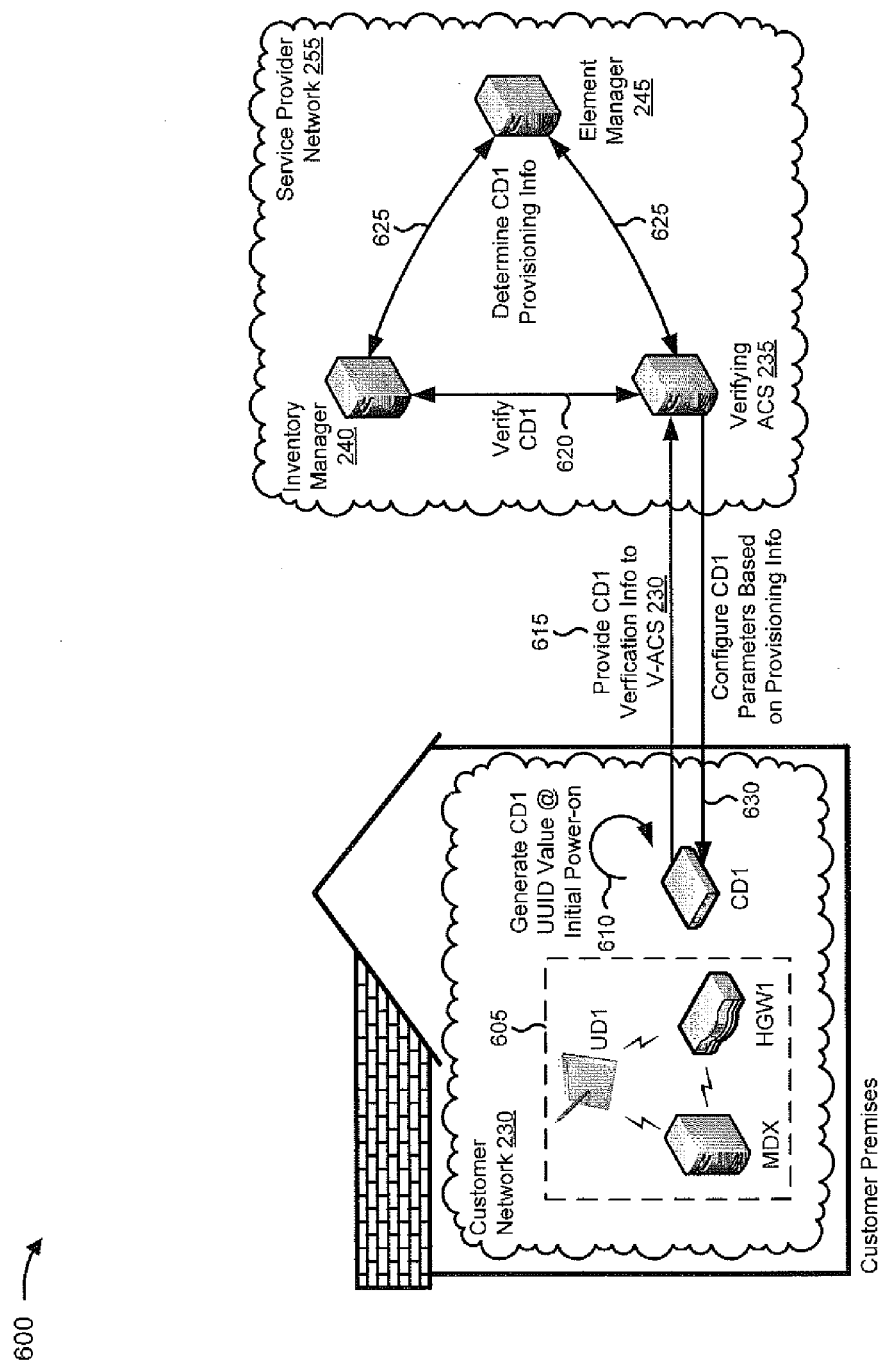
FIGS. 6A-6C are diagrams of an example implementation relating to the example processes shown in FIG. 4 and FIG. 5.
Figure 6B:
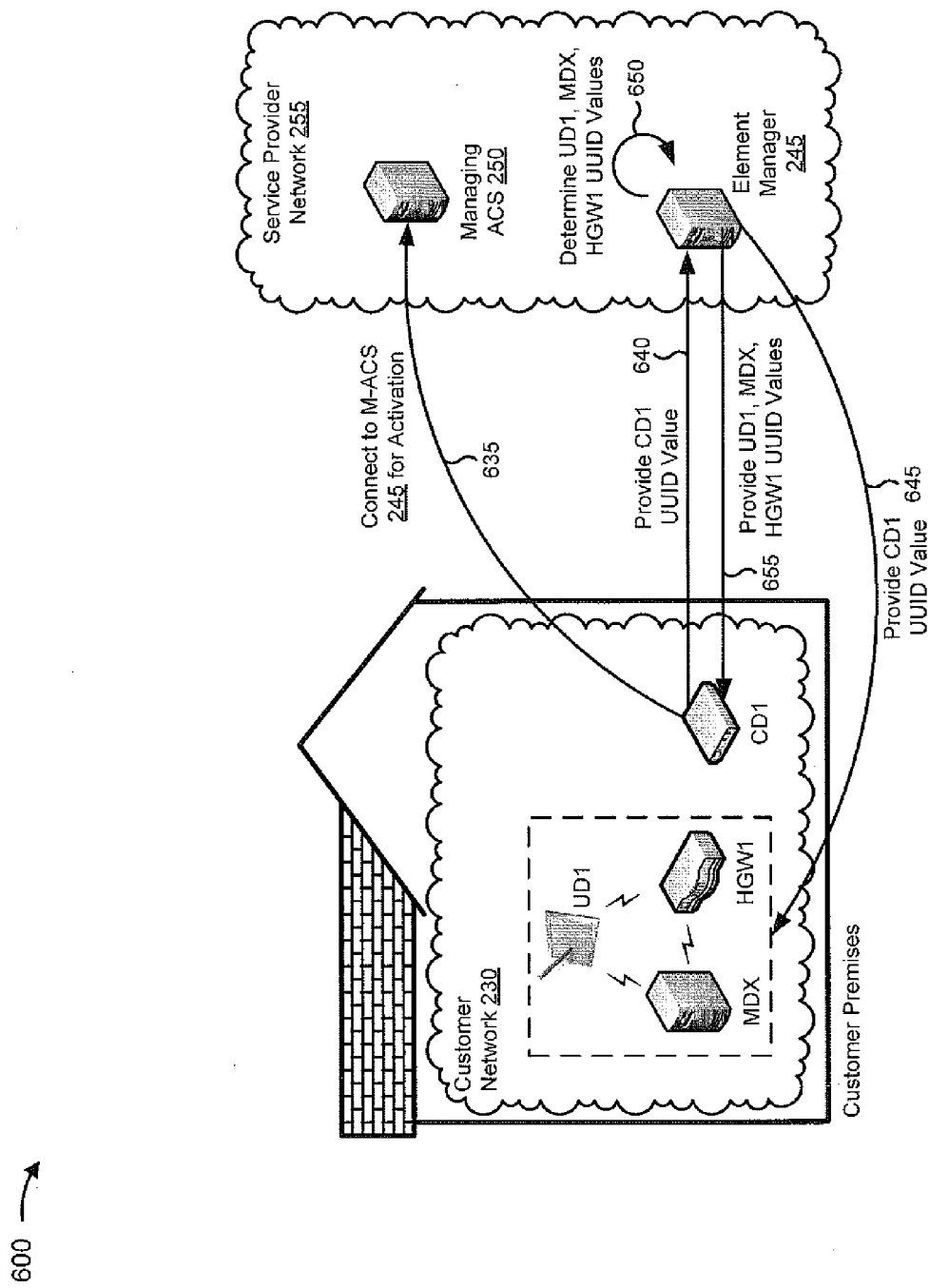
Figure 6C:
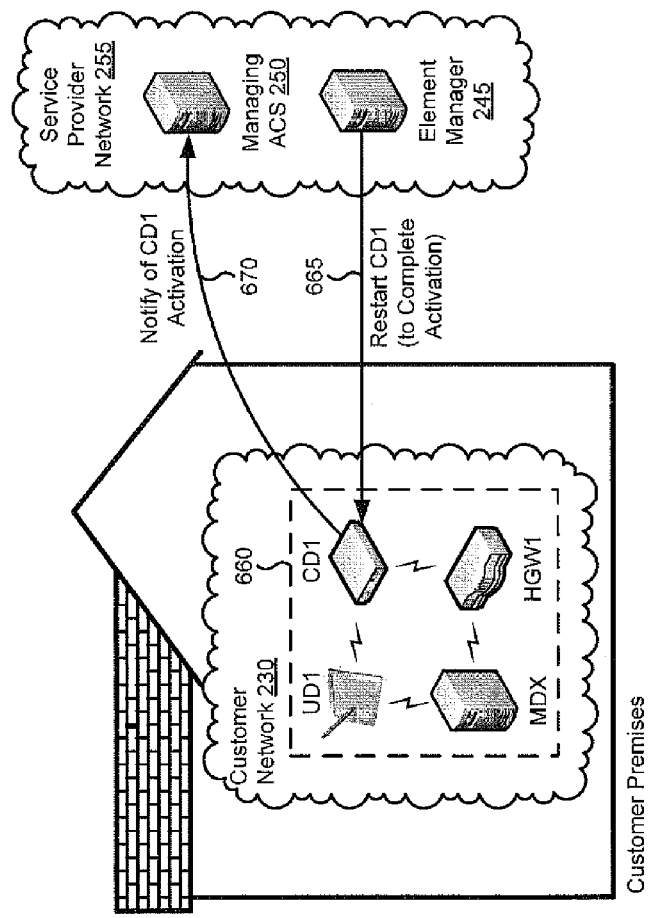

FIGS. 6A-6C are diagrams of an example implementation 600 relating to example processes 400 and 500 shown in FIG. 4 and FIG. 5, respectively. For the purposes of example implementation 600, assume that a customer has received, from a service provider, a client device 215 (e.g., a DM device identified as CD1) that is to be verified, configured, and activated such that CD1 may communicate with existing DM devices included in customer network 230 associated with the customer. Further, assume that CD1 is to be activated to allow CD1 to be remotely managed by the service provider (e.g., via one or more devices included in service provider network 255) and/or locally managed by the customer (e.g., via one or more of the existing DM devices included in customer network 230). Finally, assume that communications between DM devices included in example implementation 600 and devices of service provider network 255 use an out-of-band remote management protocol, such as TR-069.

As shown in FIG. 6A, and by reference number 605, assume that customer network 230 includes a group existing DM devices (e.g., a media device 210 identified as MDX, a user device 220 identified as UD1, and a network device 205 identified as home gateway 1 (HGW1)) that has been activated to communicate with one another via customer network 230. As shown by reference number 610, the customer may power on CD1 for the first time, and CD1 may generate a device identifier associated with CD1 (e.g., CD1 UUID value). As shown by reference number 615, CD1 may provide (e.g., based on a URL stored by CD1) verification information (e.g., an IP address associated with customer network 230, a serial number associated with CD1, etc.) to verifying ACS 235. As shown by reference number 620, verifying ACS 235 may receive the verification information (e.g., including the CD1 serial number and the IP address), may query inventory manager 240, and may verify CD1 by determining that the serial number and the IP address, included in the verification information, match a corresponding serial number and a corresponding IP address, associated with the customer, stored by inventory manager 240.

Verifying ACS 235 may notify element manager 245 that CD1 has been verified, and as shown by reference number 625, element manager 245 may determine provisioning information associated with CD1. The provisioning information may include information that identifies managing ACS 250 that is to manage CD1, as well as other provisioning information associated with activating CD1. As shown by reference number 630, element manager 245 may provide (e.g., via verifying ACS 235) the provisioning information to CD1 (e.g., including the information that identifies managing ACS 250). CD1 may then be configured by updating a parameter, based on the provisioning information, to cause CD1 to connect to managing ACS 250.

As shown in FIG. 6B, and by reference number 635, CD1 may connect to managing ACS 250. At this point, CD1 has been verified, has been configured to be managed by managing ACS 250, and may now be activated to communicate with UD1, MDX, and HGW1 (e.g., the existing DM devices included in customer network 230) such that the CD1 may manage and/or be managed by the existing DM devices via customer network 230.

As shown by reference number 640, CD1 may provide the CD1 UUID value to element manager 245. As shown by reference number 645, element manager 245 may determine address information (e.g., a set of network addresses) associated with UD1, MDX, and HGW1, and may provide the CD1 UUID value to UD1, MDX, and HGW1. Similarly, as shown by reference number 650, element manager 245 may determine (e.g., based on information stored by managing ACS 250) a set of UUID values corresponding to UD1, MDX, and HGW1, and, as shown by reference number 655, may provide the set of UUID values to CD1.

As shown in FIG. 6C, and by reference number 660, CD1, UD1, MDX, and HGW1 may (e.g., based on receiving the respective UUID values) update corresponding parameters to permit CD1, UD1, MDX, and HGW1 to communicate via customer network 230. As shown by reference number 665, element manager 245 may issue, to CD1, a commanding indicating that CD1 is to restart to complete activation. As shown by reference number 670, CD1 may restart, and may notify managing ACS 250 that activation is complete.

As such, the new DM device (e.g., CD1) may be automatically verified, configured, and activated to permit the new DM device to be remotely managed by one or more devices included in service provider network 255, and to permit the new DM device to communicate with the existing DM devices via customer network 230.

As indicated above, FIGS. 6A-6C are provided merely as an example. Other examples are possible and may differ from what was described with regard to FIGS. 6A-6C.

Implementations described herein may allow a DM device, associated with a customer network, to be automatically (e.g., without human intervention) verified, configured, and activated (e.g., using a remote management protocol) to allow the DM device to communicate with other DM devices, associated with the customer network, such that the DM device may be managed via the customer network and/or may manage one or more other of the other DM devices via the customer network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A managing device, comprising:
one or more processors configured to:
receive, from a verification device, a notification that a first universal plug and play (UPnP) device management (DM) device stores an IP address of a local area network of a user;
receive a first device identifier that identifies the first UPnP DM device based on receiving the notification, the first UPnP DM device being a UPnP DM device that has not been previously configured to communicate with other UPnP DM devices on the local area network, and
the first UPnP DM device being powered on in the local area network; identify a second UPnP DM device based on receiving the first device identifier,
the second UPnP DM device being a UPnP DM device configured to communicate with other UPnP devices on the local area network and being different than the first UPnP DM device;
provide the first device identifier to the second UPnP DM device based on identifying the second UPnP DM device, the first device identifier being provided to the second UPnP DM device to allow the first UPnP DM device to be managed by the second UPnP DM device via the local area network;
determine, based on identifying the second UPnP DM device, a second device identifier that identifies the second UPnP DM device; and
provide the second device identifier to the first UPnP DM device,
the second device identifier being provided to the first UPnP DM device to allow the second UPnP DM device to manage the first UPnP DM device via the local area network.

2. The managing device of claim 1, where the one or more processors are further configured to:
communicate with the first UPnP DM device and the second UPnP DM device using an out-of-band remote management protocol.

3. The managing device of claim 1, where the one or more processors are further configured to:
determine information that identifies an auto-configuration server associated with the first UPnP DM device; and
cause a parameter of the first UPnP DM device to be modified after determining the information that identifies the auto-configuration server; and
where the one or more processors, when receiving the first device identifier, are configured to:
receive the first device identifier after causing the parameter to be modified.

4. The managing device of claim 1, where the one or more processors are further configured to:
cause an activation of the first UPnP DM device to be completed after providing the second device identifier to the first UPnP DM device.

5. The managing device of claim 1, where the one or more processors are further configured to:
receive the first device identifier without user intervention,
identify the second UPnP DM device without user intervention,
provide the first device identifier to the second UPnP DM device without user intervention,
determine the second device identifier without user intervention, and
provide the second device identifier to the first UPnP DM device without user intervention.

6. The managing device of claim 1, where the one or more processors are further configured to:
determine provisioning information associated with first UPnP DM device and the second UPnP DM device,
the provisioning information including the second device identifier that identifies the second UPnP DM device; and
where the one or more processors, when determining the second device identifier, are configured to:
determine the second device identifier based on the provisioning information.

7. The managing device of claim 1, where the first device identifier includes a universally unique identification (UUID) value generated by the first UPnP DM device,
the UUID value being generated by applying a hash function to a public key infrastructure certificate associated with the first UPnP DM device.

8. A computer-readable medium storing instructions, the instructions comprising:
one or more instructions that, when executed by one or more processors of a managing device, cause the one or more processors to:
obtain, from a verification device, a notification that a first universal plug and play (UPnP) device management (DM) device stores an IP address of a local area network of a user;
obtain a first device identifier that identifies the first UPnP DM device based on obtaining the notification,
the first UPnP DM device being a UPnP DM device that has not been previously configured to communicate with other UPnP DM devices on the local area network, and
the first UPnP DM device being powered on in the local area network; identify a second UPnP DM device after obtaining the first device identifier,
the second UPnP DM device being a UPnP DM device configured to communicate with other UPnP DM devices on the local area network, and
the second UPnP DM device being different than the first device;
send the first device identifier to the second UPnP DM device based on identifying the second UPnP DM device,
the first device identifier being sent to the second UPnP DM device to permit the first UPnP DM device to manage the second UPnP DM device via the local area network;
determine, based on identifying the second UPnP DM device, a second device identifier that identifies the second UPnP DM device; and
send the second device identifier to the first UPnP DM device,
the second device identifier being sent to the first UPnP DM device to permit the second UPnP DM device to be managed by the first UPnP DM device via the local area network.

9. The computer-readable medium of claim 8, where the one or more instructions, when executed by the one or more processors, further cause the one or more processors to:
communicate with the first UPnP DM device and the second UPnP DM device using a remote management protocol.

10. The computer-readable medium of claim 8, where the one or more instructions, when executed by the one or more processors, further cause the one or more processors to:
determine information that identifies an auto-configuration server associated with the first UPnP DM device; and
cause a parameter of the first UPnP DM device to be modified based on the information that identifies the auto-configuration server; and
where the one or more instructions, when obtaining the first device identifier, cause the one or more processors to:
receive the first device identifier based on causing the parameter to be modified.

11. The computer-readable medium of claim 8, where the one or more instructions, when executed by the one or more processors, further cause the one or more processors to:
send an instruction to the first UPnP DM device,
the instruction causing the first UPnP DM device to restart or reboot to complete activation of the first UPnP DM device.

12. The computer-readable medium of claim 8, where the one or more instructions, when executed by the one or more processors, further cause the one or more processors to:

receive the first device identifier without user intervention,
identify the second UPnP DM device without user intervention,
provide the first device identifier to the second UPnP DM device without user intervention,
determine the second device identifier without user intervention, and
provide the second device identifier to the first UPnP DM device without user intervention.

13. The computer-readable medium of claim 8, where the one or more instructions, when executed by the one or more processors, further cause the one or more processors to:
determine provisioning information associated with first UPnP DM device and the second UPnP DM device,
the provisioning information including the second device identifier that identifies the second UPnP DM device; and
where the one or more instructions, when determining the second device identifier, cause the one or more processors to:
determine the second device identifier based on the provisioning information.

14. The computer-readable medium of claim 8, where the second device identifier includes a universally unique identification (UUID) value generated by the second UPnP DM device,
the UUID value being generated by applying a hash function to a public key infrastructure certificate associated with the second UPnP DM device.

15. A method, comprising:
receiving, by a managing device and from a verification device, a notification that a first universal plug and play (UPnP) device management (DM) device stores an IP address of a local area network of a user;
receiving, by the managing device, a first device identifier identifying the first UPnP DM device based on receiving the notification,
the first UPnP DM device being a UPnP DM device that has not been previously configured to communicate with other UPnP DM devices on the local area network,
the first UPnP DM device being powered on in the local area network, and
the first UPnP DM device being a customer of a service provider;
identifying, by the managing device, a second UPnP DM device based on receiving the first device identifier,
the second UPnP DM device being a UPnP DM device connected to the local area network and the customer of the service provider, and
the second UPnP DM device being different than the first UPnP DM device;
providing, by the managing device, the first device identifier to the second UPnP DM device based on identifying the second UPnP DM device,
the first device identifier being provided to the second UPnP DM device to allow the first UPnP DM device to communicate with the second UPnP DM device via the local area network;
determining, by the managing device and based on identifying the second UPnP DM device, a second device identifier identifying the second UPnP DM device; and
providing, by the managing device, the second device identifier to the first UPnP DM device,
the second device identifier being provided to the first DM UPnP device to allow the second DM UPnP device to communicate with the first UPnP DM device via the local area network.

16. The method of claim 15, where the managing device is to communicate with the first UPnP DM device and the second UPnP DM device using a remote management protocol.

17. The method of claim 15, further comprising:
determining information that identifies an auto-configuration server associated with the first UPnP DM device; and
causing a parameter of the first UPnP DM device to be modified based on the information that identifies the auto-configuration server; and
where receiving the first device identifier comprises:
receiving the first device identifier based on causing the parameter to be modified.

18. The method of claim 15, comprising at least one of:
receiving the first device identifier without user intervention;
identifying the second UPnP DM device without user intervention;
providing the first device identifier to the second UPnP DM device without user intervention;
determining the second device identifier without user intervention; or
providing the second device identifier to the first UPnP DM device without user intervention.

19. The method of claim 15, further comprising:
determining provisioning information associated with first UPnP DM device and the second DM UPnP device,
the provisioning information including the second device identifier identifying the second UPnP DM device; and
where determining the second device identifier comprises:
determining the second device identifier based on the provisioning information.

20. The method of claim 15, where the first device identifier includes a universally unique identification (UUID) value generated by the first UPnP DM device.

* * * * *